Nov. 29, 1966 J. M. ALEXANDER ETAL 3,287,948
COLD FORMING ARTICLES FROM LENGTHS OF ROD, BAR OR TUBE
Filed June 26, 1963 2 Sheets-Sheet 1

United States Patent Office 3,287,948
Patented Nov. 29, 1966

3,287,948
COLD FORMING ARTICLES FROM LENGTHS OF ROD, BAR OR TUBE
John Malcolm Alexander and Bela Lengyel, South Kensington, London, England, assignors to National Research Development Corporation, London, England
Filed June 26, 1963, Ser. No. 290,798
Claims priority, application Great Britain, June 29, 1962, 25,128/62
7 Claims. (Cl. 72—57)

The present invention relates to the cold-forming of articles having substantial lateral projections from lengths of rod, bar or tube and more particularly but not exclusively to the cold-forming of articles, such as flanged articles, in which the cross-sectional area in the region of the lateral projections is greater than that of the rod, bar or tube.

Hitherto flanged steel articles formed from bar such as, for example, gears having integral shafts have either been machined from the solid with consequent waste of material or else have been hot forged, often involving several alternative heating and forging operations. The article so formed is comparatively soft and must therefore in many cases be subjected to an additional heat treatment to produce the required degree of hardness.

Cold-forming of many metals, particularly steels, produces useful work-hardening of the metal but the large scale deformation of the metal necessary to produce subtantial lateral projections results in fractures under normal methods of cold-working.

It is accordingly the principal object of the invention to provide a method of cold-forming articles made from hard material such as steel having substantial lateral projections from lengths of bar, rod or tube.

In the method according to the present invention, the length of rod, bar or tube to be formed into the article is forced into a die channel having at its entry the same cross-section as the rod, bar or tube and leading into a die chamber having wall surfaces defining the shape of the article, the interior of the die chamber being filled with fluid which is maintained at a high pressure. The die chamber is formed in a die block which can be split to enable the formed article to be removed after the pressure has been relieved.

Conveniently the fluid is glycerine which in the case of an article to be formed from carbon steel may be maintained at a high pressure of the order of about 40 to 80 tons per square inch, liquid being allowed to escape from the die chamber as the bar or rod is forced into it. Other fluids may be used, such as a castor oil or a mixture of glycerine and water, for example.

The cold-forming of a simple flanged article by a method according to the invention will now be described by way of example with reference to the accompanying drawings in which.

Figure 1:
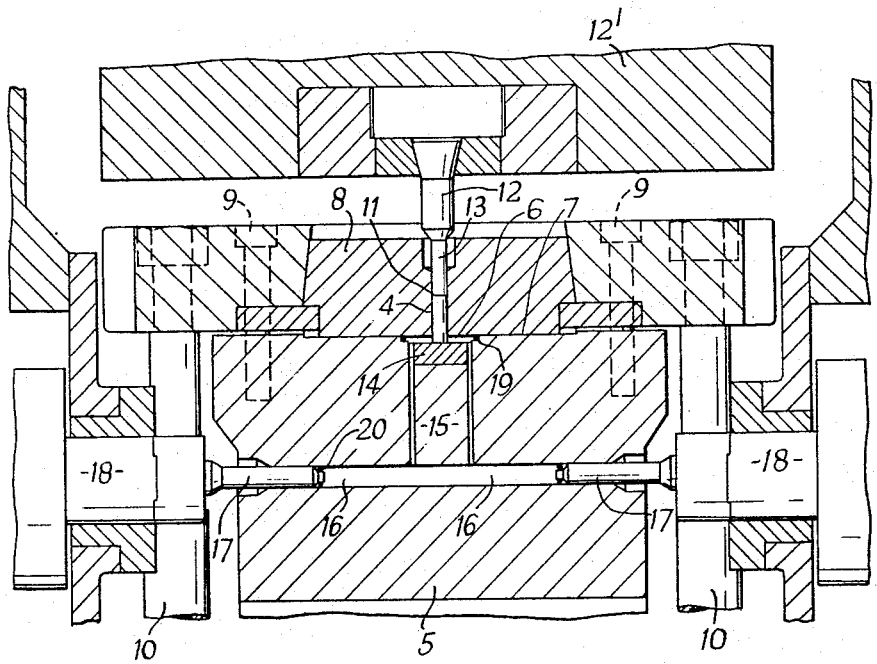
FIG. 1 is a vertical section of an apparatus for carrying out the method, in the condition just before the cold-forming operation.
Figure 3:
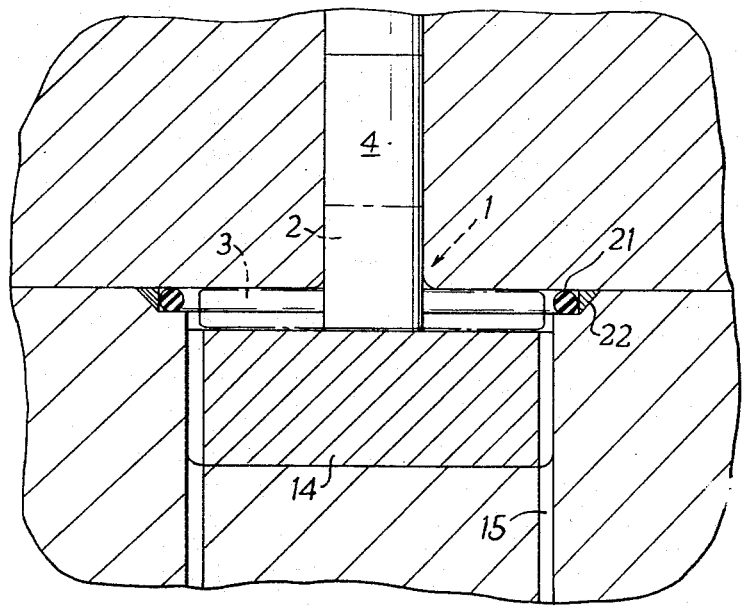
FIG. 3 shows a part of FIG. 2 on an enlarged scale.
Figure 2:
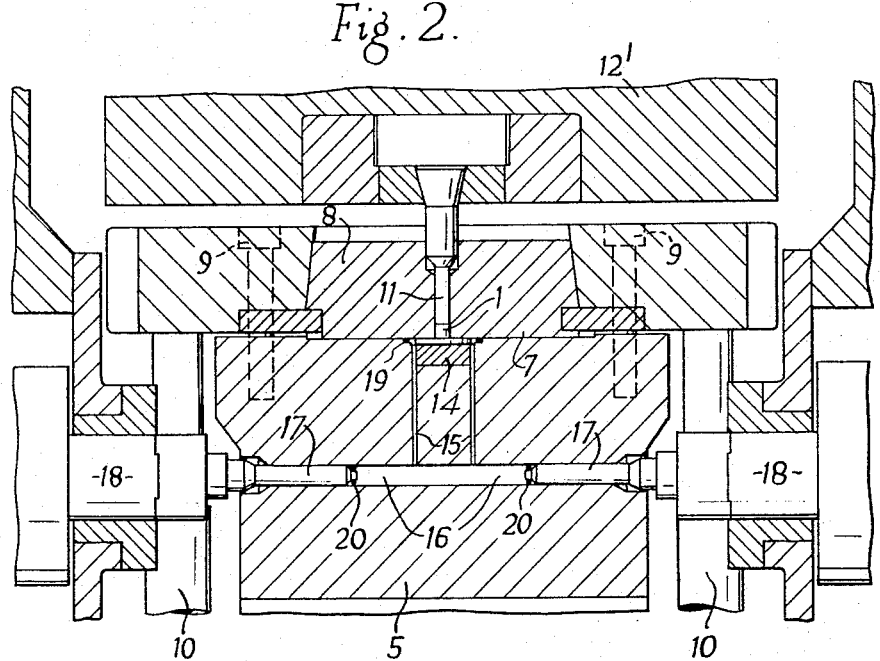
FIG. 2 is a section, corresponding to FIG. 1, of the apparatus just after the forming operation.

Referring to FIGS. 1 to 3 of the drawings, the article to be made has a cylindrical stem 2 of diameter ¾ inch and is flanged at one end to form a disc 3 of diameter 2.7 inches and thickness 0.2 inch. The overall length of the article (measured in the direction of the common axis of the stem and the flange) is 0.6 inch and the junction between the stem and the flange is radiused to form a fillet. The article is formed from a 3 inch length (4, FIG. 1) of ¾ inch diameter bar and hence the formation of the flange involves increasing the cross-sectional area (measured at right angles to the axis of the article) by a factor of about 13.

The force required to cold-form the article is obtained by the use of a hydraulic press. The lower die 5 of the press contains a die chamber 6 having the same general dimensions as the article, with its axis vertical and flange lowermost. The lower die 5 is split horizontally at the level 7 of the junction of the stem and the flange of an article in the die chamber, the upper portion 8 of the lower die being clamped rigidly to the lower portion either by a ring of bolts 9 or by hydraulic rams (similar to those marked 10) until it is desired to remove the formed article from the die chamber.

The upper part of the die chamber, corresponding to the stem 2 of the article, continues upwards to form a die channel 11 of diameter ¾ inch and total height of 3¼ inches above the flange part of the die chamber.

A plunger 12 carried by the upper die 12' of the hydraulic press has a lower cylindrical portion 13 2.8 inches long which is a close sliding fit in the die channel, the upper part of the ram being of greater diameter to increase its strength.

The circular floor of the die chamber is formed by a detachable cylindrical die bed 14. Between the die bed 14 and the remainder of the lower portion of the lower die 5 are formed a number of passages 15 through which glycerine can be supplied to and removed from the die chamber 6.

The necessary hydraulic pressure to prevent fracture of the flange during the cold forming operation is obtained by means of a pair of horizontally opposed hydraulic cylinders 16 formed integrally in the lower portion of the lower die 5 and connected to the passages 15 supplying the die chamber 6, pistons 17 in the hydraulic cylinders 16 being connected to external hydraulic rams 18 of much larger diameter.

To form an article, the die chamber 6, die channel 11, passages 15 and hydraulic cylinders 16 are charged with glycerine, the billet or rod 4 inserted in the upper end of the die channel 11 and pushed downwards into the die channel until its upper end enters the die chamber to contact the bed 14 as shown in FIG. 1, the pressure of the glycerine being negligible. The plunger 12 is then forced down on the billet 4 to drive its lower end into the die chamber 6, the pressure of the glycerine in the die chamber 6 being increased to a high value in the region of 40 to 80 tons per square inch. As the lower end of the billet moves into the die chamber 5, the pistons 17 of the horizontal hydraulic cylinders 16 are allowed to move outwards to maintain the pressure of the glycerine substantially constant.

When the plunger 11 has reached the end of its travel and the lower end of the length of rod has substantially filled the die chamber as shown in FIG. 2, the hydraulic pressure is relieved, the plunger 11 withdrawn and the upper portion of the die removed, exposing the formed article.

Other shapes of article may be similarly cold-formed by suitably shaping the die chamber. The lower die may have to be split into more than two portions in appropriate directions to enable the formed article to be removed.

In order to obtain effective sealing between the upper and lower portions of the die block and between the pistons 17 and the walls of the cylinders 16 against the high pressure in the die chamber and connected passages it is preferred to use a double sealing ring (19 for the die chamber, 20 for the pistons 17) comprising a neoprene or other synthetic O-ring 21 (FIG. 3) backed up by a metal mitre ring 22 of triangular or wedge-shaped section. This ring 22 may be of copper-berryllium alloy.

As an alternative to the plunger 12, the billet may be driven down the die channel by the direction application of hydraulic fluid under pressure.

In some cases the volume of the hydraulic fluid is sufficient to allow only a small increase of pressure to occur due to its compression. It is not then necessary to allow the pistons 17 to move to maintain the hydraulic pressure substantially constant.

Figure 4:
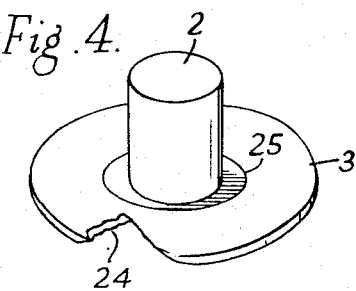
FIGS. 4 to 6 are perspective views of test articles formed under various operating conditions.
Figure 5:
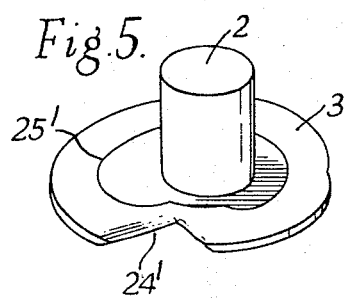
Figure 6:
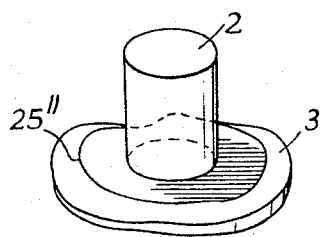

The effect of the use of the high pressure fluid on the billet during the cold-forming process is shown by the test samples illustrated in FIGS. 4 to 6. The samples were obtained by allowing the plunger 12 to complete only about the first half of its travel. The material of the billets was in each case commercially pure aluminum.

The sample shown in FIG. 4 was obtained with no fluid pressure in the die chamber. In spite of the comparatively high ductility of the metal, there is a typical tensile fracture 24 in the flange 3. In addition, only a small part bounded by the line 25 of the flange has come into contact with the surface of the upper portion 8 of the die block.

The sample shown in FIG. 5 was obtained using glycerine in the die chamber under a pressure of about ten tons per square inch. Although the flange 3 is again fractured at 24′, the fracture is of the drawn out "knife-edge" type. In addition, the area within the boundary 25′ is larger than that within the boundary 25 of FIG. 4.

The sample shown in FIG. 6 was obtained using glycerine under a pressure of about 20 tons per square inch. In this sample there is no fracture and the area within the boundary 25″ is larger than are the other samples.

It thus appears that there may be a minimum or threshold pressure for satisfactory operation of the process. In the case of aluminum for example this value appears to be between 10 and 20 tons per square inch.

The high pressure involved tend to improve the mechanical properties of the material by closing up any flaws therein.

We claim:

1. The method of cold-forming an article having a substantial lateral projection from a billet of bar or tube, comprising the steps of applying a force to said billet to force said billet down a die channel conforming to the billet in cross-section into a die chamber and into contact with wall surfaces of said chamber and thereby deforming the material of said billet a substantial distance laterally of the direction of said force to form said projection, said billet being in contact with fluid under high fluid pressure during the deformation of said billet, and removing said article from said die chamber.

2. The method of claim 1, in which said high fluid pressure is at least about the yield strength of the material of said billet.

3. The method of claim 1, in which said fluid is a liquid selected from the group consisting of glycerine, castor oil and a mixture of glycerine and water.

4. The method of cold-forming an article having substantial lateral projections from a billet bar or tube in which said billet is forced down a die channel having the same cross-section as the billet into a die chamber to deform a substantial distance laterally in said die chamber, said die chamber having wall surfaces determining the shape of the article, said wall surfaces including portions laterally spaced from said die channel, to define at least one lateral projection of said article and said die chamber containing fluid which is maintained at high hydrostatic pressure.

5. The method of claim 4, in which the said pressure is maintained substantially constant by allowing fluid to escape from the die chamber as the billet is forced into the die chamber.

6. Apparatus for cold-forming articles from billets of bar or tube, comprising a die block having a die chamber and a die channel therein said die channel leading from a surface of the die block into said die chamber, said die chamber including a portion extending a substantial distance laterally from said die channel, said die block consisting of at least two separable portions enabling said article to be removed from said die chamber by separation of said portions, a plunger close fitting and slidable in said die channel and means for maintaining a high fluid pressure in said die chamber.

7. Apparatus according to claim 6, in which said pressure maintaining means comprises a ram-operated piston sildably mounted in a bore in the die block, said bore being connected by passage means with the die chamber.

References Cited by the Examiner

UNITED STATES PATENTS

| 1,613,595 | 1/1927 | Abel | 72—353 |
| 2,168,641 | 8/1939 | Arbogast | 72—354 |
| 2,783,727 | 3/1957 | Hoffmann | 72—57 |

CHARLES W. LANHAM, *Primary Examiner.*

L. A. LARSON, *Assistant Examiner.*